United States Patent [19]
Barry et al.

[11] Patent Number: 5,517,332
[45] Date of Patent: May 14, 1996

[54] DOCUMENT SCANNER HAVING ONE-PIECE HOUSING FOR HOLDING AN IMAGE SENSOR, DRIVE ROLLER AND DOCUMENT SENSORS IN CLOSE ALIGNMENT WITH EACH OTHER

[76] Inventors: Michael R. Barry, 1021 College Ave., Palo Alto, Calif. 94306; David E. Burgess, 310 Central Heights Dr., Concord, N.C. 28025; Michael F. Gifford, 2699 Richland Ave., San Jose, Calif. 95125; Gregory A. Greenly, 8012 Buckingham La., Harrisburg, N.C. 28075; Paul A. Hakenewerth, 9900 Spindrift Ct., Charlotte, N.C. 28269; Michael G. Horeth, 6041 Marris Farm La., Charlotte, N.C. 28277-5172; Raymond J. McKinnon, Jr., 3611 Arcadian Ct., Castro Valley, Calif. 94546; Michelle J. Pillers, 20655 Celeste Cir., Cupertino, Calif. 95014; Thomas H. Yonenaka, 309 Oak Ct., Daly City, Calif. 94014

[21] Appl. No.: 217,195

[22] Filed: Mar. 23, 1994

Related U.S. Application Data

[63] Continuation of Ser. No. 143,213, Oct. 25, 1993, abandoned.
[51] Int. Cl.$^6$ ........................................ H04N 1/10
[52] U.S. Cl. .................... 358/496; 358/498; 358/474
[58] Field of Search ................................ 358/496, 498, 358/400, 473–474; 355/311; 235/475–476; 271/221, 265.01, 272; H04N 1/10

[56] References Cited

U.S. PATENT DOCUMENTS 4,043,665  8/1977  Caldwell.
4,132,401  1/1979  Gauronski et al..

(List continued on next page.)

FOREIGN PATENT DOCUMENTS 0509406  10/1992  European Pat. Off..
0551890   7/1993  European Pat. Off..
62-183255  8/1987  Japan.
1-179563   7/1989  Japan.
2-268560  11/1990  Japan.
2-308663  12/1990  Japan.
5-328005  12/1993  Japan.

OTHER PUBLICATIONS

PaperMax Scanner: Document Management for Real People, Mar. 1994, Visioneer.
Paper Max: One Scan Closer to Paperlessness, Mar. 29, 1994, Visioneer.

(List continued on next page.)

Primary Examiner—Kim Yen Vu
Attorney, Agent, or Firm—Thomas A. Gallagher

[57] ABSTRACT

A one-piece housing holds an image sensing module having a transparent image sensing surface and a document drive roller in close alignment. A cover closely fits around the housing and is positioned in close alignment with respect to the housing. The cover and housing cooperate to define a document entry path in which a plurality of sensors are located: a set of document-skew-detecting sensors and a set of document-insertion-detecting sensors, the sets of sensors acting independently of each other. The number and spacing of the sensors is the set of document-insertion-detecting sensors is such that the narrowest expected document encounters at least one such sensor. The cover and housing also cooperated to define a document scanning path and one or more document exit paths. The cover includes a movable member adjustable by a user to either one of two positions, the member cooperating with the cover and housing to define a first document exit path directing documents toward the user and a second document exit path directing documents away from the user. The cover includes a plurality of cover portions, the cover portions interlocking to accurately position the cover portions with respect to each other and the housing.

27 Claims, 7 Drawing Sheets

U.S. PATENT DOCUMENTS

| | | |
|---|---|---|
| 4,548,401 | 10/1985 | Nishikawa . |
| 4,558,373 | 12/1985 | Plasencia et al. . |
| 4,630,123 | 12/1986 | Kadomatsu .............................. 358/498 |
| 4,886,967 | 12/1989 | Itakura . |
| 5,070,415 | 12/1991 | Matsumoto .............................. 358/496 |
| 5,072,923 | 12/1991 | Coy . |
| 5,128,763 | 7/1992 | Sakuragi .................................. 358/498 |
| 5,138,463 | 8/1992 | Morimoto et al. ...................... 358/496 |
| 5,149,977 | 9/1992 | Mita . |
| 5,161,038 | 11/1992 | Hakkaku et al. ........................ 358/496 |
| 5,267,058 | 11/1993 | Sata . |
| 5,267,059 | 11/1993 | Kawabata et al. ...................... 358/498 |
| 5,274,477 | 12/1993 | Mori et al. .............................. 358/498 |
| 5,327,250 | 7/1994 | Ikeda ....................................... 358/400 |
| 5,337,165 | 8/1994 | Riousset et al. ........................ 358/498 |

OTHER PUBLICATIONS

Visioneer Clear the Way for New Desk Top Scanner, PC Week Oct. 31, 1994, Visioneer.
Myth of the Paperless Office will follow us into New Year, MacWeek Dec. 12, 1994, Visioneer.
Paper Max, MVP Dec. 1994, Visioneer.
Page Scanners Put an End to Paper Pushing, Chicago Sun–Times, Dec. 1994, Visioneer.
Paper Port/Desktop Scanner, Mac World Communications, 1995, Visioneer.
Scan Documents on the Fly, Fortune 1995, Visioneer.
Getting Ahead in the Paper Chase, Jun. 1995, Visioneer.

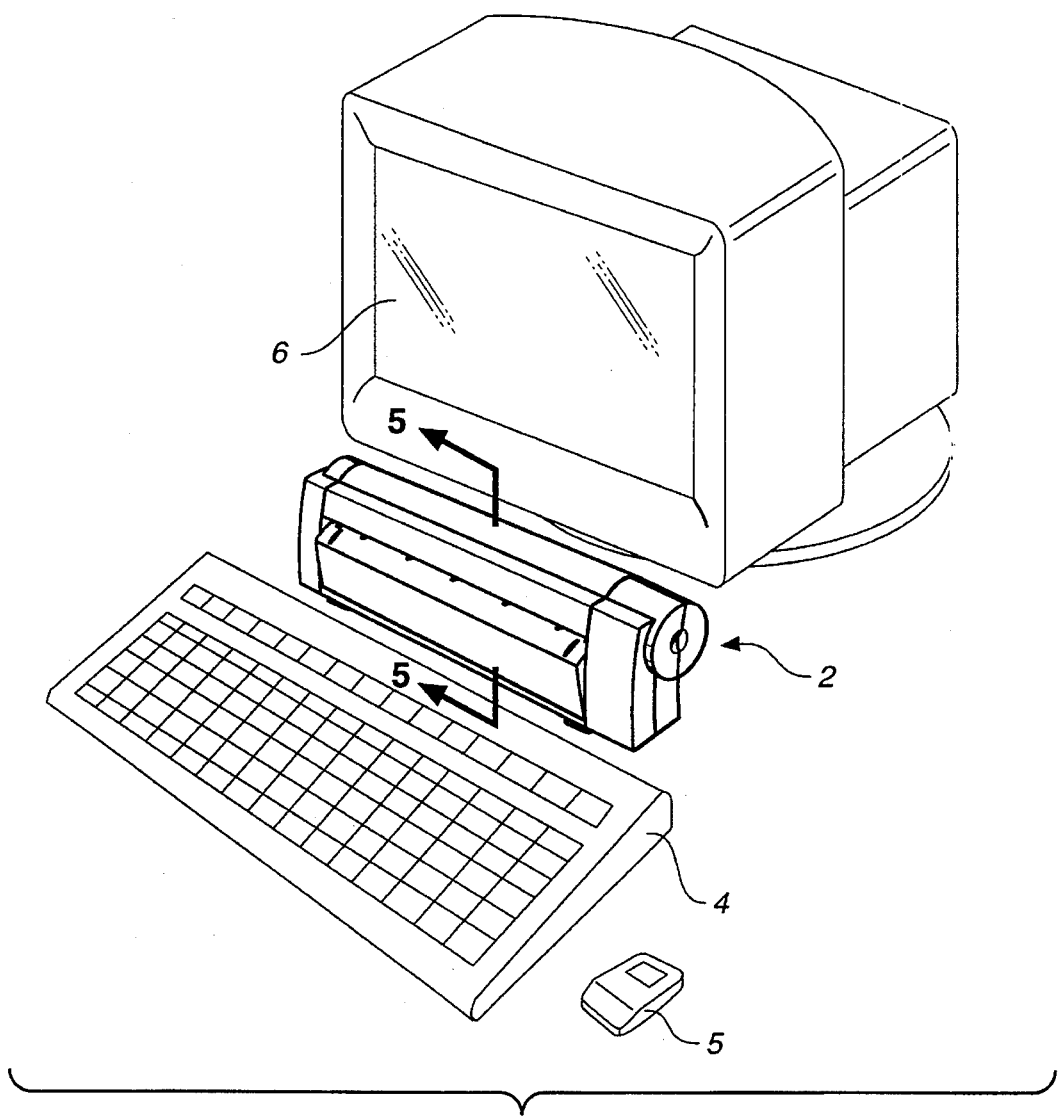
FIG._1

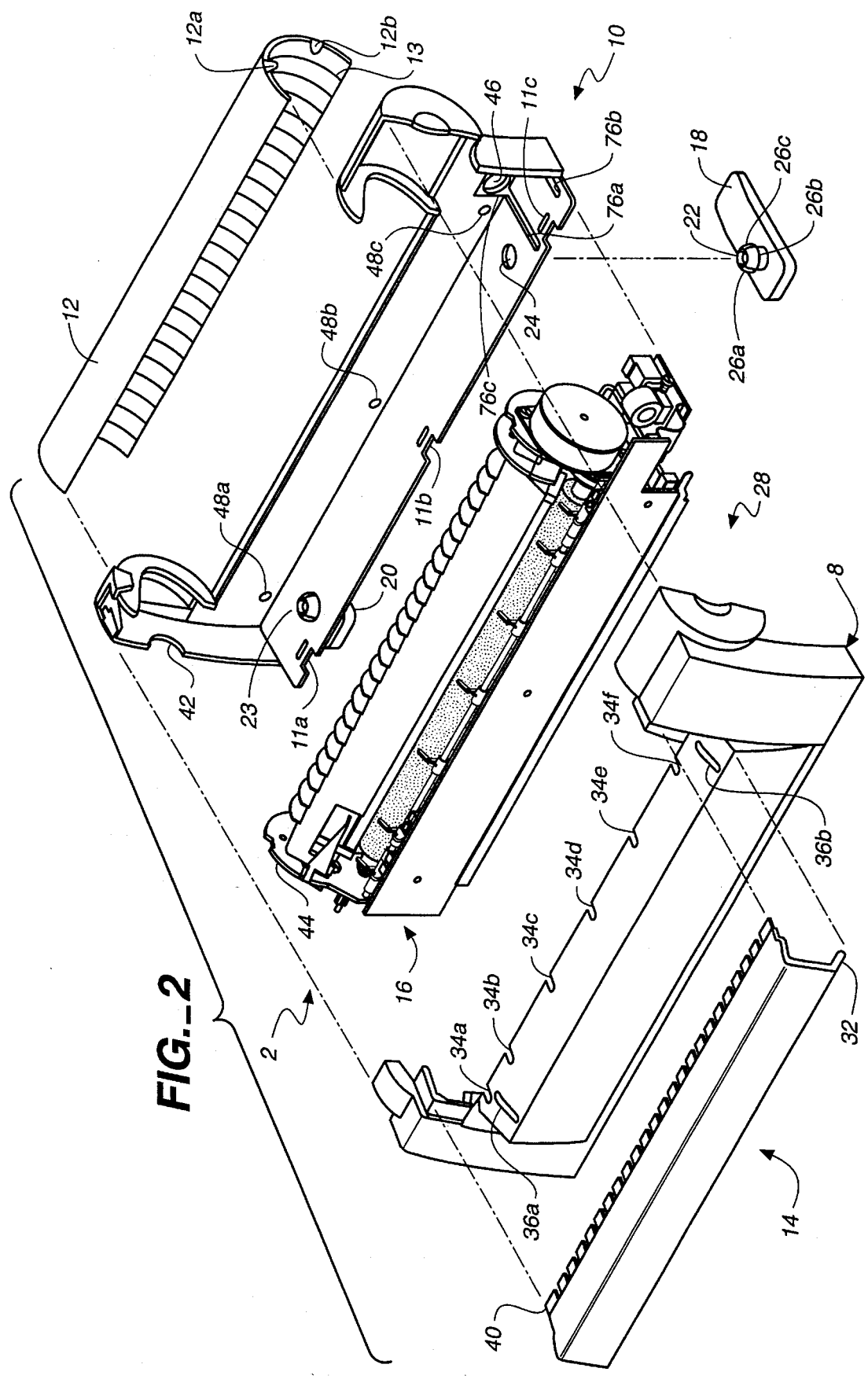
FIG._2

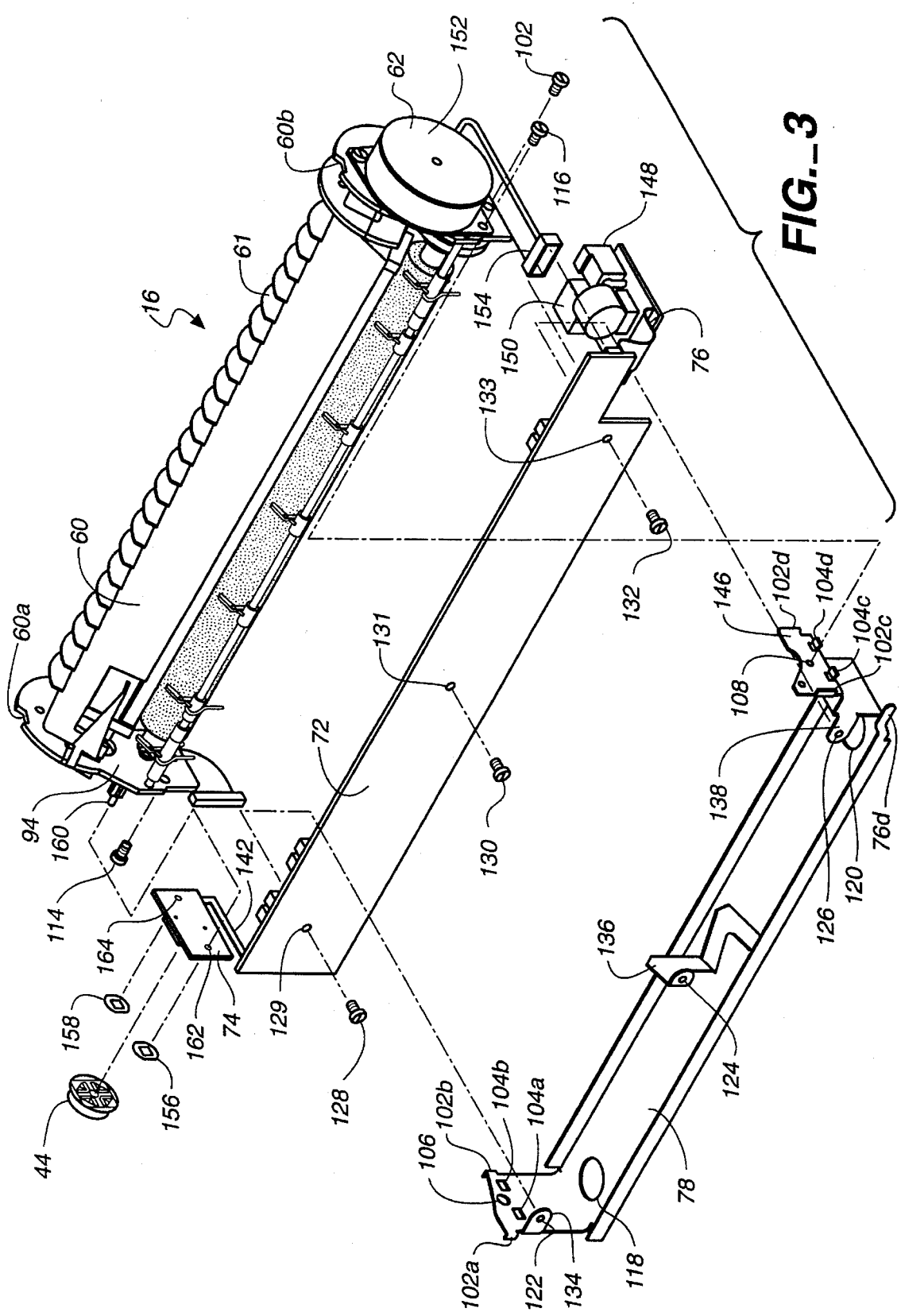
FIG._3

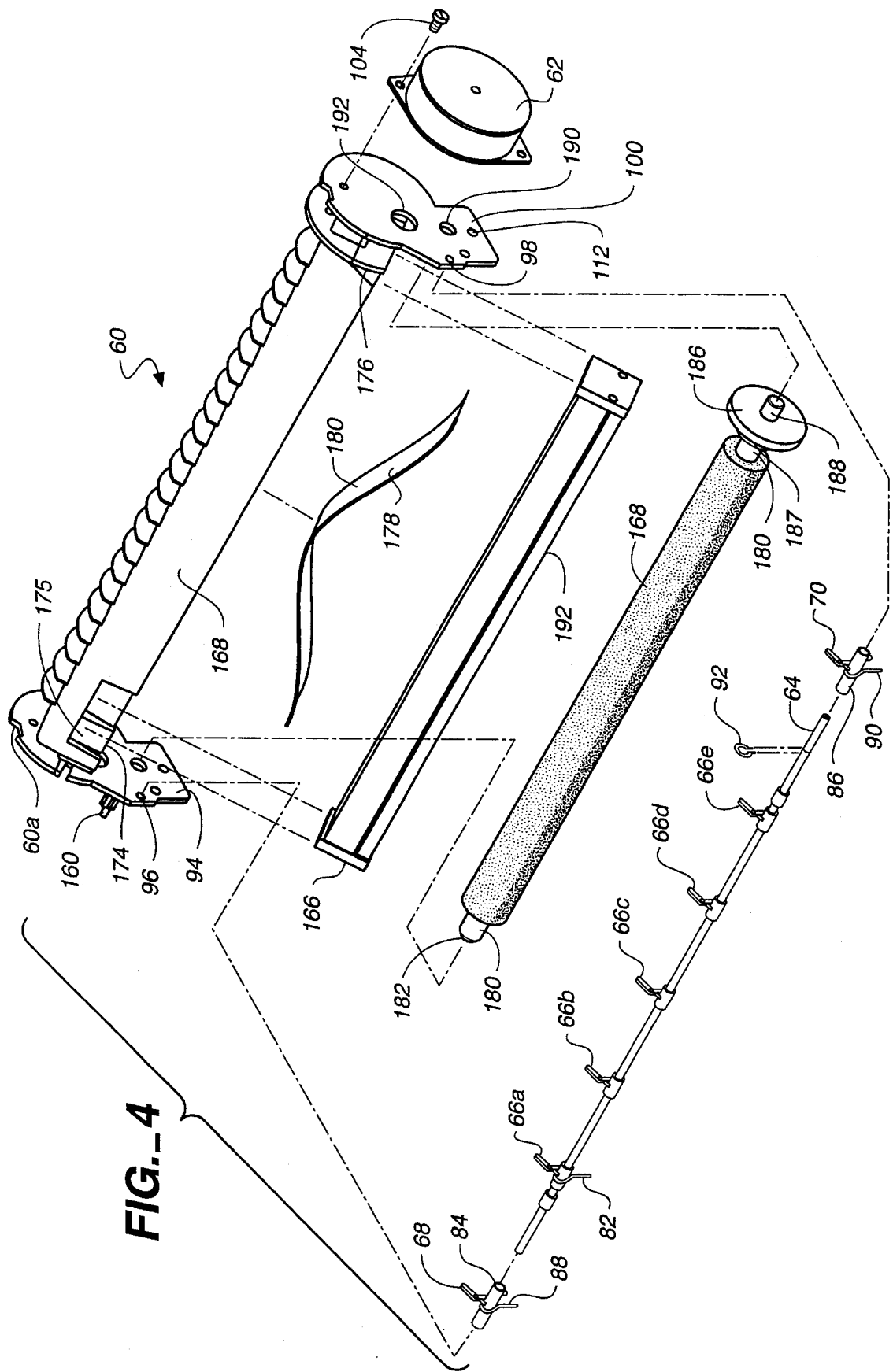
FIG._4

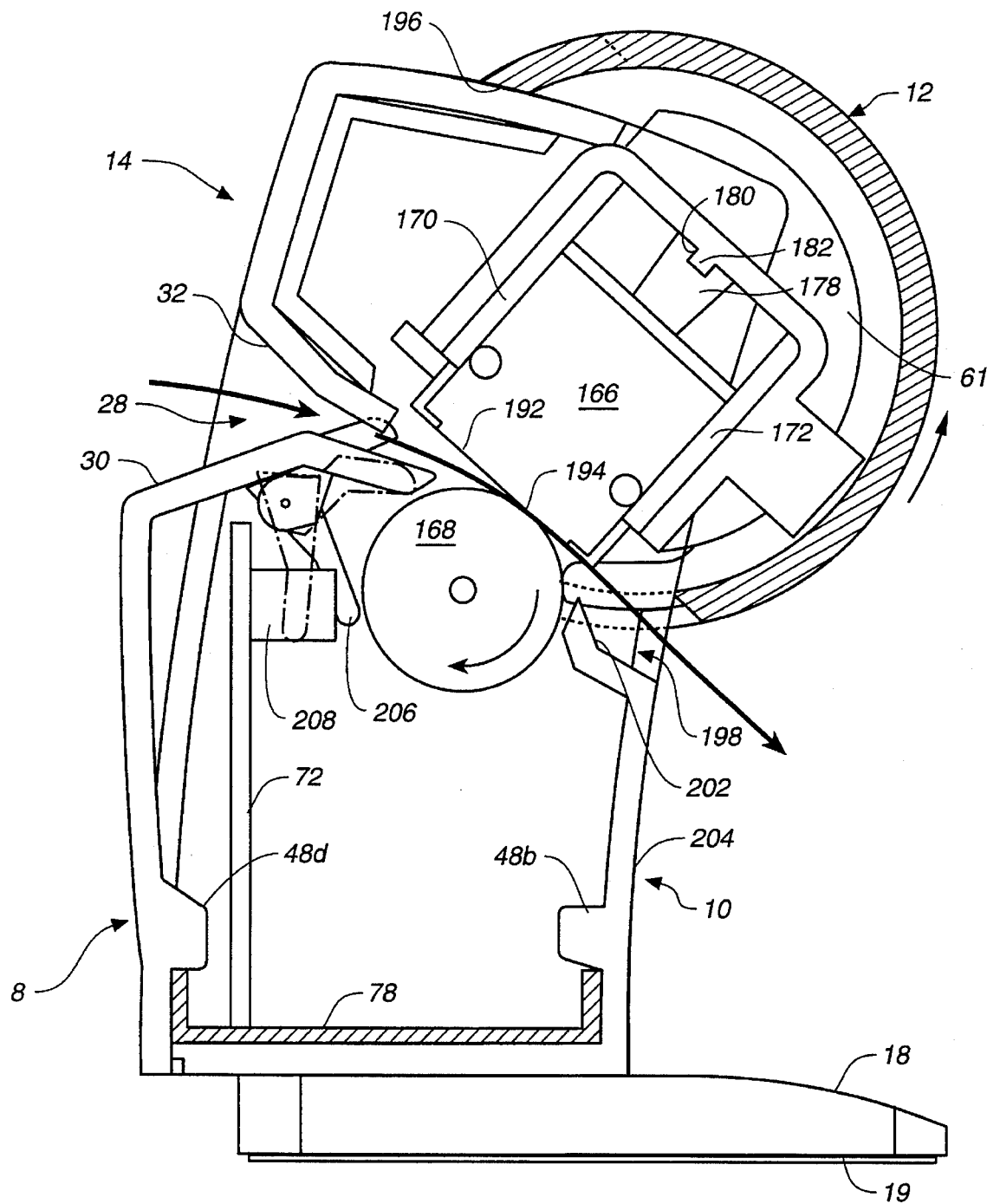
FIG._5

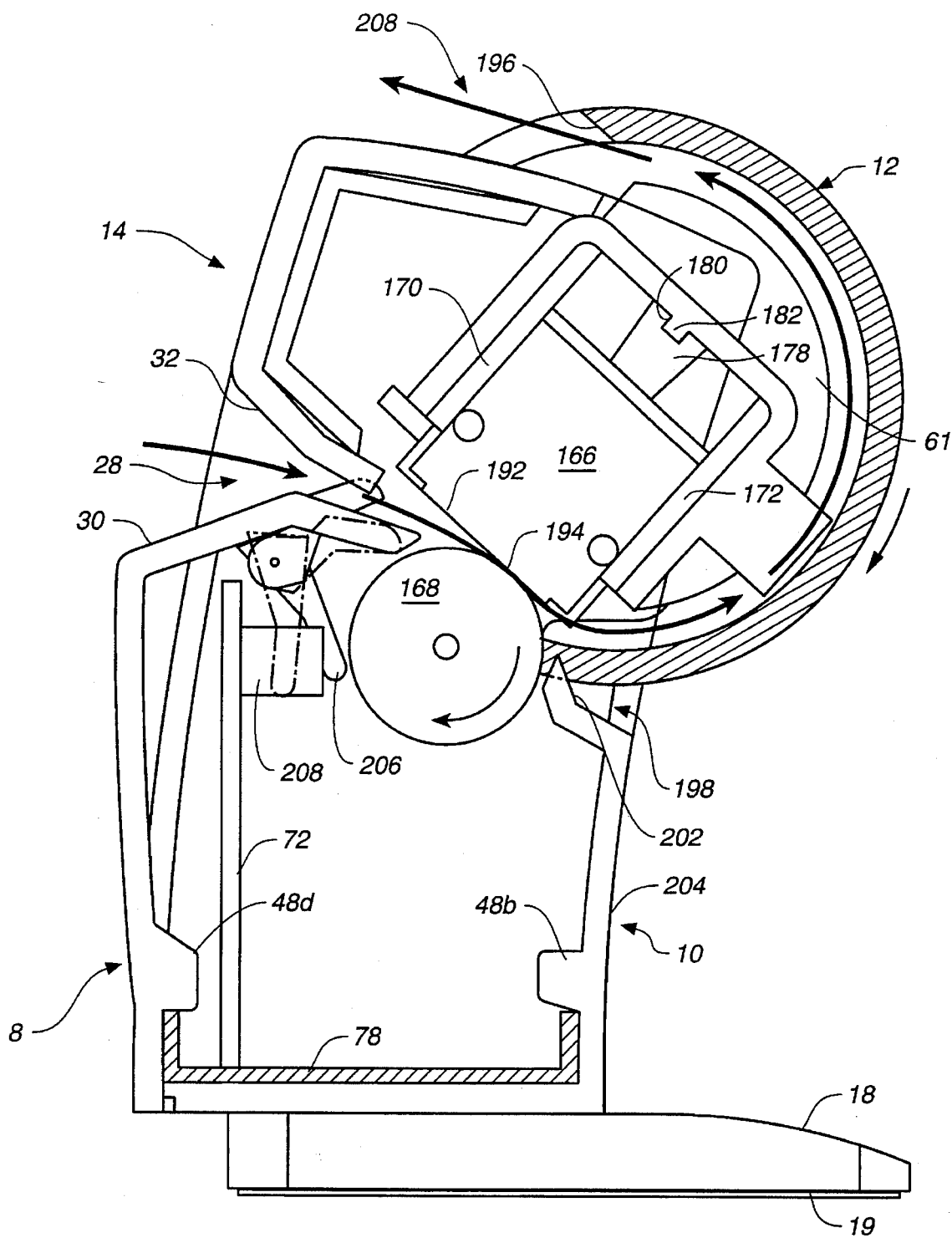
FIG._6

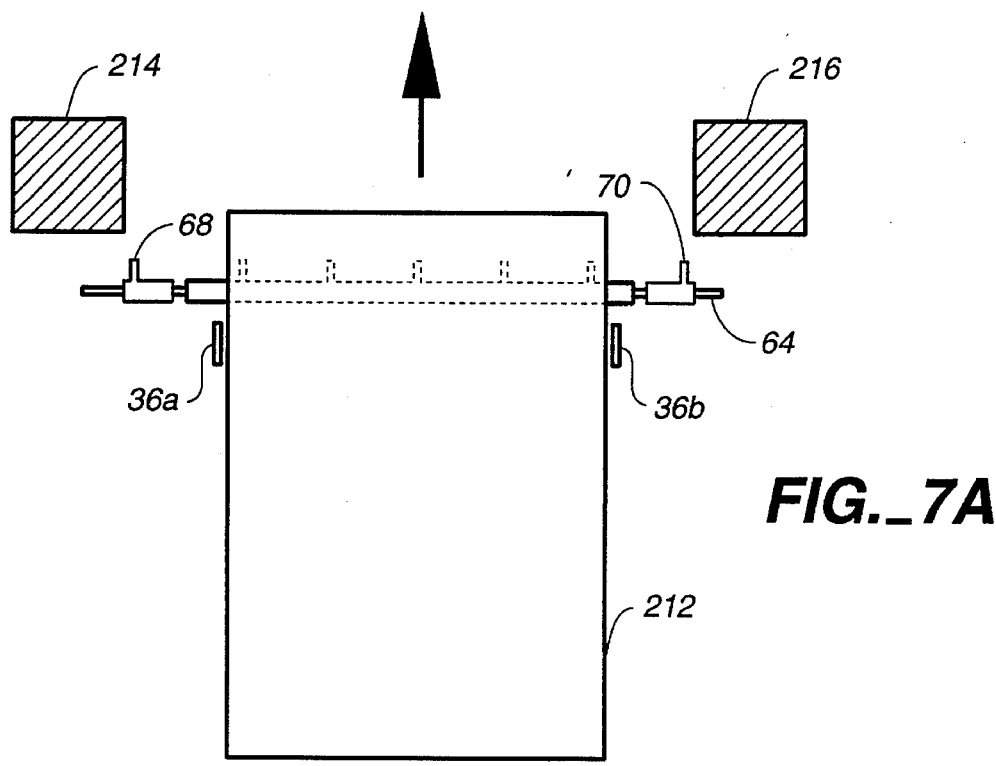
FIG._7A
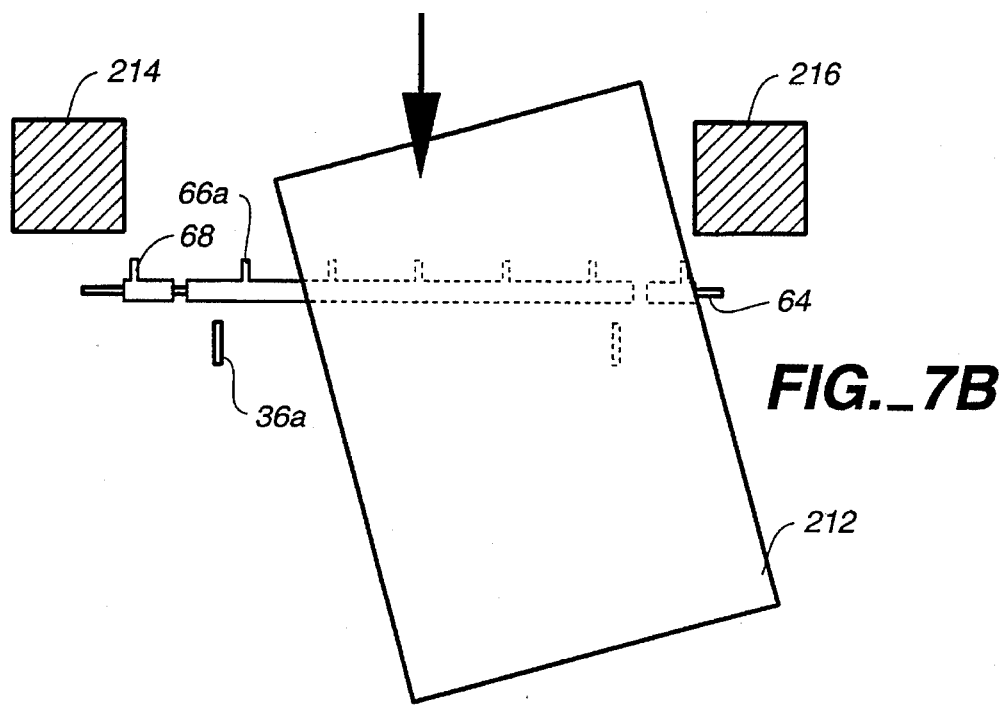
FIG._7B

DOCUMENT SCANNER HAVING ONE-PIECE HOUSING FOR HOLDING AN IMAGE SENSOR, DRIVE ROLLER AND DOCUMENT SENSORS IN CLOSE ALIGNMENT WITH EACH OTHER

CROSS-REFERENCE TO RELATED APPLICATION

This application is a continuation of application Ser. No. 08/143,213, filed Oct. 25, 1993, abandoned.

BACKGROUND OF THE INVENTION

The invention relates generally to apparatus for scanning documents, such as sheets of paper or card stock. More particularly, the invention relates to a relatively compact, inexpensive, easily assembled and easy to use scanner which is nevertheless capable of high quality performance.

SUMMARY OF THE INVENTION

In accordance with the present invention, a housing holds an image sensing module and a document drive roller in contact with each other, thus providing a single drive roller document driving mechanism. The sensing module has a transparent image sensing surface. The image sensing module and drive roller are precisely held in contact with a controlled force by the housing along a contact line substantially aligned with the center line of image sensing of the image sensing module. The document drive roller has a hardness selected such that the coefficient of friction between the drive roller and a typical paper or card stock document inserted in the scanner is sufficient to overcome the coefficient of friction between the document and the transparent image sensing surface of the image sensing module. The drive torque of the document drive roller is sufficient to avoid stalling of the drive motor when the scanned document is exiting and the drive roller is turning against the transparent image sensing surface of the sensing module. The document drive roller is held by said housing bearing-free and the housing is formed from a material having a coefficient of friction sufficiently low as to provide a self-bearing surface with the drive roller.

Further in accordance with the present invention, a cover means closely fits around the housing and is positioned with respect to the housing. The cover means and housing cooperate to define a document entry path, a document scanning path and one or more document exit paths. The cover means includes a chute adjustable to either of one of two positions, the chute cooperating with the cover means and housing to define a first document exit path on the opposite side of said scanner from the document entry path and a second document exit path on the same side of the scanner as the document entry path. The cover means includes front and rear covers, the covers including means for interlocking and positioning the front and rear covers with each other and with said housing. Means such as flags intersect the entry path for detecting the insertion of a document. The entry path includes means for detecting when the inserted document is skewed and would be damaged if scanned or of it is outside the scanning region.

BRIEF DESCRIPTION OF THE DRAWINGS

FIG. 1 is a perspective view of a preferred embodiment of a document scanner embodying aspects of the present invention, shown in a typical operating environment.

FIG. 2 is an exploded perspective view of the document scanner of FIG. 1, showing its major structural elements.

FIG. 3 is an exploded perspective view of a portion of the document scanner of FIG. 1, showing the central housing portion and other internal elements in greater detail.

FIG. 4 is an exploded perspective view of a portion of the document scanner of FIG. 1, showing the central housing portion and its relationship to the contact image sensor, document drive roller, motor hand sensing flags in yet greater detail.

FIG. 5 is a cross-sectional diagrammatic side view taken generally along section lines 5—5 of FIG. 1, showing the document scanner in its document-feed-through position.

FIG. 6 is a cross-sectional diagrammatic side view similar to FIG. 5, but showing the document scanner in its document-feed-back position.

FIG. 7A is a diagrammatic plan view illustrating the insertion and drawing into the scanner of a properly oriented document.

FIG. 7B is a diagrammatic plan view illustrating the insertion and rejection by the scanner of an improperly oriented document.

DESCRIPTION OF THE PREFERRED EMBODIMENT

In FIG. 1 of the drawings, a preferred embodiment of a document scanner 2 embodying aspects of the present invention is shown in a typical operating environment: the scanner 2 is shown placed between a standard computer keyboard 4 and a standard computer monitor 6. A standard mouse 5 is also shown. This perspective view conveys a sense of the small size of the scanner and the small operating area it requires. The scanner is very compact and, because it may be operated so as to feed back scanned documents toward the user, it may be conveniently located on the work surface between the keyboard and computer monitor for easy access. In a preferred embodiment, the scanner width is narrower than the width of a standard full size keyboard and the height of its document feed slot is high enough to provide access when the scanner is located proximate the rear edge of a standard keyboard which has its rear feet open. Very little desktop space is taken up by the scanner, making it practical to keep the scanner located where it is as accessible as is the keyboard and the mouse, permitting frequent use of the scanner. Of course, the scanner need not be located between the keyboard and monitor, but may be placed anywhere that is convenient for the user. Although a computer is not shown, it will be understood that the scanner 2, keyboard 4, mouse 5 and monitor 6 are used with a computer. For simplicity, no cables are shown in the view of FIG. 1.

Because it may be located and used so conveniently, such a scanner provides a new kind of computer input device, providing another way of inputting information and commands to a computer and, thus, supplementing traditional computer input devices such as the keyboard and mouse. This new way of inputting command and data using a scanner embodying aspects of the present invention may be characterized as "paper based computing."

The major structural elements of the document scanner 2 are shown in FIG. 2. The outside of the scanner is defined principally by a two-piece cover assembly, a front cover 8 and a rear cover 10, which lock together tightly and securely around a central structure 16. The central structure 16 physically cooperates with the front and rear covers, which closely fit around and position themselves with respect to it. The front and rear covers locate themselves with respect to the central structure 16, providing controlled and repeatable registration and alignment among the front, rear and central portions of the scanner. The resulting scanner has a high degree of structural rigidity and predictability in dimensional tolerances, assuring that the document entry path, the document scanning path and document exit path are correctly aligned to provide proper document feeding and scanning. As will be explained hereinafter, there are alternative document exit paths. Moreover, the small number of parts and the manner in which they fit together results in ease and simplicity in assembly.

Aside from aesthetic and ornamental considerations, the respective shapes of the front and rear covers 8 and 10 are determined in part by the desire to conform them to the outer contour of central structure 16, allowing them to fit closely against portions of the central structure and to interlock with each other and with the central structure. The respective cover shapes are also determined by the requirement to provide appropriately shaped document insertion and exit slots and paths which are predictably located with respect to document scanning and document moving elements, yet to be described, in the central structure 16.

FIG. 2 shows some of the means for interlocking the front and rear covers: slots 11a, 11b and 11c in the bottom portion of rear cover 10 receive hooks (not visible) located in the bottom portion of the front cover 8 to assist in locking the front and rear covers (8 and 10) to each other and around the central structure 16. Further details regarding the manner in which the front and rear covers lock together snugly around central structure 16 are set forth as the details of the scanner structure are described hereinafter.

The outer enclosure of the scanner further includes a curved chute 12, which attaches to the top of rear cover 10. In the preferred embodiment the chute is rotatable by a user to either a first position which causes the document to exit from the rear of the scanner or a second position which causes the document to exit from the front of the scanner, toward the user. Preferably, chute 12 is removable to allow access by the user to the exit path in order to clear a jammed document or to clean the interior of the scanner. The inner portion of chute 12 includes a plurality of ribs 13 which enhance the rigidity of the chute and which provide a low friction surface for the document to ride over when it exits at the front of the scanner toward the user. Chute 12 is attached to rear cover 10 by four tabs, two at each end of the chute. Tabs 12a and 12b are visible in FIG. 2. Each tab has a protrusion such that when chute 12 is snapped into place the tab protrusions ride in a pair of raceways on each side of the center-facing surfaces of the rear cover 10. The tabs riding in the raceways prevent a very stiff document from pushing the chute off when it is in the document-feedback position shown in FIG. 6 while at the same time allowing rotation of the chute 12.

The outer enclosure of the scanner also includes a nose 14 which snaps into the front cover 8. Nose 14 is a separate piece from front cover 8 because it would be difficult to successfully injection mold the front cover as a unitary piece.

The central structure 16 of the scanner 2 has a one-piece housing 60 as its core (seen best in the view of FIG. 4) and includes means for sensing document insertion, means for drawing the document into the scanner for scanning when the document is inserted and for feeding the document out of the housing, and means for scanning the document. Preferably, the central structure 16 also includes means for sensing when the document inserted is so misaligned that the document might be damaged if drawn through and fed out of the scanner.

Seen in isolation in the exploded perspective view in FIG. 2 is foot 18, one of a pair of removable and rotatable support feet 18 and 20. A portion of the other foot 20 is visible. Foot 20 is shown attached to the bottom of the rear cover 10. As best seen with respect to foot 18, each foot is generally rectangular, when viewed from the top or bottom, with a length about three times its width. Each foot has a non-skid pad affixed to its bottom surface to make the scanner resistant against sliding when a document is inserted and to protect the surface on which the device is placed. Pad 19 on foot 18 is visible in FIGS. 5 and 6. Each support foot has an integral upward-extending attachment post near one end of its length, such as post 22 on foot 18. Post 22 is split into four parts and has a hollow center and a varying diameter along its length such that the post fits into mounting hole 24 in the bottom of rear cover 10 and then snaps into place. The top portion of post 23 of foot 20 is visible at the bottom left portion of cover 10.

Each foot may be rotated by the user to either of two positions: (1) a closed position, suitable for transporting or shipping of the scanner, in which the foot is parallel to the length of the scanner housing such that the foot does not extend rearward from the scanner and (2) an open position, for supporting the scanner when in use, in which the foot is perpendicular to the length of the scanner housing and extends rearward of the scanner, thus supporting the scanner and providing forward and rearward stability. Each foot has four small equilaterally-spaced hemispherical protrusions which fit into matching depressions in the bottom surface of rear cover 10 so that when rotated, the foot snaps into and tends to remain in either its open or closed position until the user intentionally rotates the foot to the other position. In FIG. 2, three hemispherical protrusions 26a, 26b and 26c are visible near the post 22 on foot 18.

The front and rear covers 8 and 10, the rotatable chute 12, the removable nose 14 and the feet 18 and 20 are all formed from plastic material using injection molding techniques. The type of plastic is not critical—a PC/ABS material such as GE brand Cycoloy may be used, for example.

The top front portion 30 of front cover 8 provides the bottom portion of a document insertion slot 28 (best seen in the cross-sectional views of FIGS. 5 and 6). The upper portion 32 of slot 30 is provided by the bottom front portion of nose 14. The bottom front portion of nose 14 has a plurality of slots (not visible in FIG. 2), aligned with a plurality of slots 34a–34f on the rearmost part of the top front portion 30 of front cover 8. The slots in front cover 8 and nose 14 allow the document-sensing and document-skew flags to intersect fully the document input path. In addition, left and right marker ribs 36a and 36b molded into the top front portion 30 of cover 8 serve as visual guides to the scanner's edge boundaries.

Nose 14 is shaped and curved so as to snap on and off left and right brackets 38a and 38b which form a portion of the front cover 8. Nose 14 has serrations along its rear top edge 40, forming a series of fingers which define the lower side of the forward, toward-the-user, exit slot (best seen in the cross-sectional view of FIG. 6). The serrations along edge 40 are required to clear the ribs 61 of the housing 60, which forms the core of the central structure 16, as is described hereinafter. The upper side of the forward exit slot is defined by the front edge of chute 12 when the chute is rotated downward to the rear (also best seen in the view of FIG. 6).

Visible in the left rear side wall of cover 10 is the rear half 42 of a circular hole provided for an actuator button 44, which is partially visible at the left end of central structure 16. Assembly is simplified by providing half of the button hole in the rear cover and the other half in the front cover. The button may be used, for example, to reverse the direction of the document feed motor when a document has been inserted into the scanner and is being drawn through the scanner by the document drive roller. The circuitry for providing that function forms no part of this invention and is not shown. The motor is described hereinafter. A circular hole 46 in the rear wall of cover 10 allows access to a data jack 150 (described in connection with FIG. 3) on the lower rear of central structure 16.

Also visible in FIG. 2 are three tabs 48a, 48b and 48c in the inside rear wall of cover 10. The tabs engage the upturned rear edge of a chassis cover plate affixed to the housing 60 of the lower rear portion of central structure 16 when the front and rear covers 8 and 10 are snapped together around central structure 16 in order to aid in providing structural rigidity. FIGS. 5 and 6 show tab 48b engaging the chassis cover plate rear edge. A similar set of three tabs (not visible in FIG. 2) engage the upturned front edge of the chassis cover plate (such a tab, tab 46d, is shown engaging the chassis cover plate front edge in FIGS. 5 and 6).

The central structure 16 of the scanner is shown in greater detail in the exploded perspective views of FIGS. 3 and 4. The core of the central structure 16 is a one-piece housing 60. Housing 60 provides a precisely dimensioned support structure for a contact image sensor (CIS) module 166 and a document drive roller 168, as described below in connection with FIG. 4. Housing 60 also provides a bearing surface for various moving parts, including the drive roller 168, and provides a secure and protected mounting surface for a printed circuit board and related sub-boards.

Housing 60 is formed from an injection molded plastic, preferably a plastic material which provides both a low friction bearing surface and also has electrostatic drain qualities. In the preferred embodiment the material used is an LNP DCL 4532, a polycarbonate with an additive mix of 15% carbon fibers, 13% silicon and 2% Teflon. Because this material provides a sufficiently low coefficient of friction, no supplemental beatings are required, thus simplifying the scanner and reducing its cost.

The top and rear portions of housing 60 include a plurality of ribs 61 (only one rib is labeled "61" in order to avoid cluttering the drawing). In addition to providing further structural rigidity, the ribs provide a low friction surface defining one side of an exit channel (the other side is provided by ribs 11 on the inside of chute 12) for documents in the document-feed-back mode of operation. The ribs also provide electrostatic draining for documents exiting to the front of the housing.

The top of each curved side of housing 60 has a notch 60a and 60b, respectively, for engaging a hook (not shown) carried by each end of the front and rear covers 8 and 10, thus fastening the top portions of the covers together with each other and with housing 60.

Mounted to housing 60 are a reversible drive motor 62; a shaft 64 carrying a plurality of centrally-located document-detecting flags 66a–66e, a left edge skew-detecting flag 68, and a right edge skew-detecting flag 70; a main printed circuit board 72; a left printed circuit sub-board 74; a right printed circuit sub-board 76; and a chassis 78. Also mounted to housing 60 is a document drive roller 168, described in connection with the description of FIG. 4.

Each of the five centrally-disposed flags 66a–66e has a hollow cylindrical portion which is molded to shaft 64. Thus, flags 66a–66e are connected together via shaft 64 and move in unison. A coil spring 82 mounted at the left end of flag 66a lightly biases the shaft 64 and flags 66a–66e in the position shown. The spring works against the main printed board surface. The spring force is very light such that the presence of the flags in the document insertion path is essentially imperceptible to the user. A suitable spring load is 17 gm-mm at 90 degree deflection. The ends of shaft 64, carried by holes the end walls of housing 60, rotate in those holes, the housing 60 material providing a self-bearing action.

When a document is inserted in the scanner, the document encounters at least one of the document-detecting flags 66a–66e, causing them to rotate downward. The number and spacing of the flags 66a–66e is such that the narrowest common document, a business card turned in its narrow dimension, for example, will encounter at least one flag without any requirement for the user to use any care in lining up the document with a flag.

When the document-detecting flags 66a–66e rotate downward in response to a document, an optical sensor (shown in FIGS. 5 and 6 and discussed in connection with the description of FIG. 5) is triggered by a tail (shown in FIGS. 5 and 6) on flag 66a, a signal is generated to start the drive motor in the direction which rotates the document drive roller 168 in the direction to draw the document into the scanner. The signal generation and motor control form no part of the invention and are not shown. Alternatively, instead of using flags as described, an optical sensing arrangement may be used such that insertion of a document breaks directly breaks the optical sensing path. The flag approach of the preferred embodiment has the advantage that it operates even with transparent documents. Flags 66a–66e, molded to metal shaft 64, are formed of the same material as housing 60 and, due to their carbon fiber content, provide an electrostatic discharge function with respect to inserted documents. The aluminum housing of the CIS module 166 also provides an electrostatic discharge function for scanned documents.

The edge-skew-detecting flags 68 and 70 each has its own separate hollow cylindrical portion, 84 and 86, respectively, each coaxial with and rotatable around shaft 64. Each flag is lightly biased by coil springs 88 and 90, respectively, each of which has the same configuration and characteristics as spring 82. Springs 88 and 90 also work against the surface of the main PC board. Thus, the skew-detecting flags 68 and 70 operate independently of each other and of the document-detecting flags 66a–66e.

An E-clip 92 snaps into a circumferential groove (not shown) near the right end of shaft 64 in order to position the right skew-detecting flag 70. The left skew-detecting flag 68 is trapped by the left wall 94 of the one-piece housing 60. The length of the coaxial flag cylinder portions 84 and 86 is such that the length along shaft 64 determined by the E-clip 92 and the wall surface 94 allows non-binding rotational movement of the flags. All of the flags are injection molded from the same material as housing 60. The shaft 64 carrying the various flags may be formed from nickel plated carbon steel or stainless steel.

When either the left-skew-detecting flag 68 or the right-skew-detecting flag 70 is rotated downward in response to a skewed document, a respective optical sensor (see the description of FIG. 5) is triggered by a tail portion (see the description of FIG. 5) of each of the flags 68 and 70. Triggering the optical sensor reverses the drive motor direction so as to reverse the document feed roller direction, thereby feeding the document back out of the scanner's entry slot. The signal generation and motor control form no part of the invention and are not shown. The skew flags 68 and 70 are located such that they will be actuated if a document is skewed sufficiently that the feeding through of a document will cause any damage to the document.

In assembly, the hollow cylinder portions 84 and 86 of the flags, along with the respective springs 82, 88 and 90 are slipped over shaft 64. The left end of shaft 64 is inserted into a hole 96 (see FIG. 4) in the left wall 94 of the one-piece housing 60. The right end is inserted into a hole 98 (see FIG. 4) in the right wall 100 of the one-piece housing 60. When mounted on the right wall 100 by screws 102 and 104, the motor 62 captures the shaft 64. The flags require no bearings because of the material they are made from and the inside dimensions of the their hollow cylindrical portions with respect to the outside dimension of shaft 64 with which they are coaxial.

The chassis 78, which also serves as a bottom plate for the housing 60, has an upward-going left side having four extending tabs 102a, 102b, 104a and 104b and a threaded screw hole 106. Similar tabs 102c, 102d, 104c and 104d along with a threaded screw hole 108 are provided on the upward-going right side of chassis 78. The width of chassis 78 is such that in assembly it closely fits into place between the walls 94 and 98 of the one-piece housing 60, the tabs 102a and 102b grasping the front and rear edges of wall 94 and the tabs 102c and 102d grasping the front and rear edges of wall 100. At the same time, tabs 104a and 104b grasp the bottom edge of wall 94 while tabs 104c and 104d grasp the bottom edge of wall 100. When the chassis 78 is properly in place with the tabs grasping the respective wall edges, the threaded screw holes 106 and 108 line up with screw holes 110 and 112 in walls 94 and 100, respectively, allowing screws 114 and 116 to fasten the chassis 78 firmly to housing 60.

The bottom portion of chassis 78, which extends between its upward-going left and right ends, has its edges folded up to provide additional structural rigidity and strength. Holes 118 and 120 are provided for the upward-going mounting posts 22 and 23 of foot 18 and foot 20, respectively. Also provided by chassis 78 are three threaded screw holes 122, 124 and 126 for the mounting of the printed circuit board by screws 128, 130 and 132, which pass through holes 129, 131 and 133 in the printed circuit board, respectively. Screw hole 122 is carried by a tab extension 134 on the left end of chassis 78. Screw hole 124 is carried by an extruded tab 136, folded up from the bottom of chassis 78. Screw hole 126 is carried by a tab extension 138 on the right end of chassis 78.

The right hand up-going end of chassis 78 is formed with a notch in it so as to provide clearance for the printed circuit sub-board 76. During assembly, the printed circuit sub-boards 74 and 76 initially are preferably unitary with the main printed circuit board 72 and the unitary board is constructed so that the sub-boards can be snapped off. This allows the unitary board to be tested prior to breaking the unitary board into main board 72 and sub-boards 74 and 76. It also allows the sub-boards to be wired directly to the main board by cables 142 and 144, respectively, thus avoiding the need to use connectors between the main board and sub-boards.

Sub-board 76 is positioned, aligned and captured by various fingers, rails and tabs carried by the front cover 8, the rear cover 10 and the chassis 78. These means firmly hold the sub-board in position without the need for any screws. A pair of rails 76a and 76b on the inside bottom of rear cover 10 provide the bottom support for the sub-board 76. A tab (not visible) on the inside of the rear wall of rear cover 10 to the right of hole 46 holds the rear of sub-board 76 down against the support rails 76a and 76b. A tab 76c on the inside of the rear wall of rear cover 10 holds the left edge of sub-board 76 such that its right edge is flush with the inside of the right ends of the front and rear covers 8 and 10. A finger 76d extending from chassis 78 holds the front edge of the sub-board 78 such that its rear edge is flush with the inside rear wall of the rear cover 10. Finally, a tab (not visible) on the inside front wall of front cover 8 holds the front of the sub-board 76 down against the bottom support rails 76a and 76b.

Various components, including a data jack 148 and an external power receptacle 150 are shown on the printed circuit sub-board 76. A motor cable 152 and plug 154 plug into a receptacle (not visible) on the main printed circuit board 72. The motor plug and receptacle are one of only two connectors used inside the scanner. The other internal connector 153 connects the contact image sensor module 166 (described hereinafter) via cable 155 to the main printed circuit board 72.

The left printed circuit sub-board 74 is held against the outside of the left wall of the one-piece housing 60 by first and second clips 156 and 158, respectively, which fit on posts (only post 160 is visible) extending from housing 60 and passing through mounting holes 162 and 164 in the sub-board 74. The posts are both configured in the manner of post 160, such that the outer portion of the post has a diameter dimensioned to fit with through the mounting holes and the inner portion of the post is flared out to properly position and provide support for the sub-board 74. Button 44 fits on a push switch (not shown) mounted on sub-board 74. Button 44 extends through hole 42 in the side of covers 8 and 10 (see FIG. 2).

The one-piece housing 60 also holds the CIS module 166 and document drive roller 168. These elements are best seen in the exploded perspective view of FIG. 4 and the cross-sectional diagrammatic side views of FIGS. 5 and 6. The CIS module 166 has an enclosure in the shape of a rectangular solid with a generally square cross section. When the scanner is assembled, the module is slid into a channel defined by a pair of side walls 170 and 172 and a pair of end walls 174 and 176, each wall having a wedge-shaped finger extending therefrom, all of which extend downward and form part of housing 60. The left-hand wedge-shaped finger 175 is visible in FIG. 4. The side walls and the ends of the end wall wedge-shaped fingers are dimensioned so that the CIS module 166 module location is precisely defined while permitting up and down movement of the module in the channel. Prior to installing the module 166 into the channel, a leaf spring 178 is inserted in the channel. Spring 178 is held in place by snapping an aperture 180 in it into a post 182 in the top wall of the channel (best seen in FIGS. 5 and 6). Spring 178 is bowed with its apex at aperture 180 and its ends downward so as make a two point contact near the ends of the CIS module 166, distributing its load across the CIS module 166, pushing module 166 downward. When the scanner is assembled, the drive roller 168 captures the CIS module 166 to hold it in the channel. Consequently, spring 178 pushes the CIS module against the drive roller 168.

Drive roller 168 has a substantially constant diameter throughout its working length which extends substantially along the working length of the CIS module 166. The working length of roller 168 has an outer portion formed of a rubber-like material. The underlying support shaft 180 of drive roller 168 may be formed from nickel plated carbon steel or stainless steel. The shaft 180 of roller 168 is visible at the left end of the working length of roller 168. The reduced diameter of the end region 182 of shaft 180 is dimensioned to fit into bearing hole 184 in side wall 94 of housing 60. The diameter change provides a shoulder which works against the side wall 94 to locate the left end of drive roller 168. The drive roller 168 and housing 60 preferably are formed of materials which obviate any need for separate bearings—the materials provide their own bearing surfaces, thus reducing cost and simplifying construction.

At the right side of drive roller 168, going from the central working region to the right, the shaft 180 is visible. Continuing to the right along shaft 180, a gear drive wheel 186 is attached. Gear drive wheel 186 and its collar 187 are press fit to shaft 180. The extreme right end of shaft 180 has a smaller diameter region 188 dimensioned to fit in bearing hole 190 in side wall 100 of housing 60. A shaft carrying a small gear pinion wheel (not visible) from motor 62 extends through hole 192 in side wall 100 and engages gear drive wheel 186, thus allowing the motor to drive roller 168. In the preferred embodiment, the pinion has 16 teeth and gear 190 has 72 teeth, providing a 4.5 to 1 gear ration. Motor 62 is a small reversible electric stepper motor, providing about 350 gm-cm torque. Although the motor is operated continuously during most scanning operations, its stepper capability and the gear ratio chosen makes it possible to stop and then re-start the scanning of document as may be necessary, for example, in order to permit a buffer to empty out when scanning a complex document. The details of the motor control form no part of the present invention.

Contact image sensor module 166 is an off-the-shelf commercial product composed of a rod lens array, an LED (light emitting diode) array, and a sensor array (these arrays are not visible). Such modules are well known in the scanning art. As is well know, in operation, when a document is scanned it is placed in physical contact with the clear ordinary smooth glass surface of the contact image sensor module and the document is moved with respect to the module. In a preferred embodiment of the invention, the sensor module is a model C8R216L25 manufactured by Mitsubishi Electric Corp. Japan. in which the sensor array has 1728 sensor elements and has a sensor element density of 8 dots/mm. However, the specifications and performance characteristics of the CIS module are not critical to the invention and other brands and models of CIS modules may be used.

Contact image sensor module 166 has a clear glass bottom surface 192 (best seen in FIGS. 5 and 6). The internal structure of the particular module 166 used in the preferred embodiment is such that the center line of image sensing is somewhat offset. This center line extends along the working length of the module 166 and is seen as point 194 in the cross-sectional end views of FIGS. 5 and 6. The location of the contact line between drive roller 168 and CIS module 166 should coincide as closely as possible with the center line of image sensing of the module 166. Thus, the optimum image sensing point 194 in FIGS. 5 and 6 should also be the "nip" point at which the roller and module are closest, bringing the document being scanned in contact with the CIS module 166. The relationship between the nip point and the image sensing point in the directions parallel and perpendicular to the bottom glass surface 192 is relatively critical. As the document falls away from the CIS glass surface 192 the optical viewing range changes dramatically, affecting resolution of the scanned image. The dimensional accuracy provided by the channel in the housing 60 and by the location of drive roller 168 held by housing 60 maintains the nip point (line) within a few thousandths of an inch in the direction horizontal to the glass surface 192. In the perpendicular, vertical direction, there should be enough spring force to keep the document in contact with the nip point (line).

As best seen in FIGS. 5 and 6, the document path (indicated by the dark arrows) is initially through the document insertion slot 28, pushing flag 66a and causing it to rotate out of the way downward, and then between drive roller 168 and the bottom glass surface 192 of CIS module 166, as guided by the geometry of the upper and lower entrance walls 32 and 30, respectively.

Because there is only one roller a proper balance is required among (1) the force of spring 178 loading the CIS module 166 against the drive roller 168, (2) the hardness of the drive roller 168, and (3) the drive roller rotating torque (as determined by the motor torque and gear advantage). In order to be able to draw the document into the scanner and past the CIS module 166, the coefficient of friction between the drive roller and any document which is likely to be inserted in the scanner must be sufficient to overcome the coefficient of friction between the document and the bottom glass 192 of module 166. The pressure exerted on a document must be sufficient to feed it properly yet not be so great as to cause it to bind against the surface of glass 192. Moreover, drive roller torque must be sufficient to overcome the coefficient of friction between the bottom glass 192 of module 166 and the drive roller 168 so as to rotate the drive roller against the glass, such that the roller does not bind or bite against the glass and stall the motor, when a document exits the nip region. A motor torque of 350 gm-mm acting through a gear advantage of 4.5 to 1 has been found to be sufficient.

In the preferred embodiment, the outer roller portion of drive roller 168 is formed from a silicon-based EPDM, 50–70 durometer, Shore A. In the preferred embodiment, the leaf spring 178 causes the CIS module 166 to press against the drive roller 168 with a force of about 0.6 to 0.9 lbs. Other values of roller hardness, CIS module force and drive roller torque may be used, provided the balance among them provides reliable document feeding without motor stall.

FIGS. 5 and 6 are useful particularly for understanding the operation of the scanner when the rotatable chute 12 is in its document-feed-through position (FIG. 5) and its document-feed-back position (FIG. 6). These modes of operation are determined solely by the rotation of chute 12 by the scanner's user. Preferably, the rotating chute snaps into its two positions, illustrated by FIGS. 5 and 6, by traveling over raised bumps (not shown) molded into the rear cover chute-tab-engaging raceways, providing both tactile feedback and an audible click. Also, in the preferred embodiment, at one side of the unit, graphical icons (not shown) are molded into the plastic enclosure to indicate the straight-through and the document return modes of operation and on the other side, an arrow (not shown) is molded into the plastic enclosure to indicate that the cover is movable.

In the document-feed-through position as shown in FIG. 5, chute 12 is rotated toward the user such that its forward leading edge 196 touches the top of nose 14. This results in the opening of a document exit slot 198 in the gap between the rearward edge 200 of chute 12 and the top edge region 202 of the rear wall 204 of the rear cover 10. The overall document path thus curves slightly downward from the document insertion slot 28 to the exit slot 198 as shown by the dark arrows. The top edge region 202 of the rear housing wall 204 has a slight L-shape cross-section in order to locate the extreme edge close to roller 168 while removing placing it sufficiently below the document path so that a document is unlikely to catch on it.

FIGS. 5 and 6 also provide a better understanding of the operation of the flags 66a–66e (and by analogy, flags 68 and 70). As mentioned above, only flag 66a of the group of flags 66a–66e has a tail 206. When flag 66a is rotated clockwise downward (as shown in phantom) by the insertion of a document, its tail rotates along with it and interrupts a light beam in an optical sensor 208. Flags 68 and 70 each have a similar tail (not shown) and optical sensor (not shown), respectively. To keep inserted documents from binding, all of the flags, have a soft, rounded geometry (best seen in the phantom position of flag 66a in FIGS. 5 and 6).

FIGS. 5 and 6 also provide further details of the manner in which the front and rear covers 8 and 10 are attached to the central structure 16. The chassis 78 is shown fitting into the bottom of the interior defined by the front and rear covers 8 and 10. As described hereinbefore, three tabs along the inside rear wall of rear cover 10 ride on the upturned side of chassis 78. Tab 48b is shown in FIGS. 5 and 6. Three similar tabs are located along the inner wall of front cover 8 for the same purpose. One of the three tabs 48d is shown riding in the upturned side of chassis 78.

In the document-feed-back position as shown in FIG. 6, chute 12 is away from the user such that its rearward edge 200 touches the top edge region 202 of rear wall 204, closing the rear document exit slot 198. However, this rotation of chute 12 results in the opening of a forward document exit slot 210 in the newly opened gap between the forward leading edge 196 of chute 12 and the top of nose 14. A modified document path is created such that when the document exits the nip point 194 and clears the lower rear edge of the CIS module 166 it encounters the ribs 13 on the curved inner surface of chute 12, causing the document to follow generally the inner surface of chute 12 as indicated by the dark arrows. A curved document channel path is defined on one side by the ribs on the inside of chute 12 and on the other side by the ribs 61 of housing 60. The ribs on both sides of the channel provide low friction surfaces for the document to slide against. The document exits from the front of the scanner toward the user through forward document exit slot 210.

Various means by which the front and rear covers lock together and fit snugly around central structure 16 have been described in connection with the figures. Those means include the following: a set of three hooks and slots 11a, 11b and 11c connecting the front and rear covers along their bottom side (see FIG. 2 and the accompanying description of FIG. 2); the flush fit of the bottom of the central structure 16 (i.e., the bottom of chassis 78) such that it rests on the inside bottom of rear cover 10; the flush fit of the lower sides of the central structure 16 (i.e., the outside of the upturned sides of the chassis 78) such that it is held by the inside bottom portions of the front and rear covers 8 and 10 (see FIGS. 5 and 6); the sets of tabs 48a, etc., along the inside walls of the front and rear covers 8 and 10 which hold the chassis against the inside bottom of the front and rear covers (see FIGS. 2, 5 and 6); the hooks in the top of the front and rear covers and the corresponding notches 60a and 60b in the top of housing 60 (see FIGS. 3 and 4).

The operation of the document skew sensors may be better understood by reference to FIGS. 7A and 7B. FIG. 7A, a diagrammatic plan view, illustrates the insertion and drawing into the scanner of a properly oriented document 212. Guides 36a and 36b (described in connection with FIG. 2) provide a visual reference for lining up the document. Members 214 and 216, shown in cross section, are intended to indicate schematically those portions of the scanner structure which limit the sides of the document path and which would damage an edge of the document if encountered by the document. When a document is inserted, it trips one or more of the paper insertion flags (shown in phantom in FIG. 7A), causing the document to be draw into the scanner as indicated by the arrow in FIG. 7A. When a document is sufficiently skewed, as in FIG. 7B, the document will eventually trip one of the side skew-detecting flags, as in FIG. 7B in which the right hand skew-detecting flag 70 (shown in phantom) is tripped, causing the document to be fed back out of the scanner, as indicated by the arrow in FIG. 7B.

We claim:

1. Apparatus for scanning documents, comprising
    an image sensor,
    a document drive roller, and
    a one-piece housing rotatably holding said document driver roller and movably holding said image sensor with respect to said document drive roller, the housing constraining the image sensor to move substantially perpendicularly to a plane tangential to the surface of the document drive roller at a position where the image sensor contacts the document drive roller when no document is inserted between the two.

2. Apparatus according to claim 1 further comprising a plurality of document sensors, said housing holding said document sensors in close alignment with said drive roller and said image sensor.

3. Apparatus according to claim 2, wherein the number and spacing of said document sensors is such that the narrowest common document, a business card turned in its narrow dimension, encounters at least one such sensor.

4. Apparatus according to claim 2 wherein said document sensors include a set of document-skew-detecting sensors and a set of document-insertion-detecting sensors, the sets of sensors acting independently of each other.

5. Apparatus according to claim 4 wherein the number and spacing of the sensors in said set of document-insertion-sensing sensors is such that the narrowest common document, a business card turned in its narrow dimension, encounters at least one such sensor.

6. Apparatus according to claim 4 further comprising a cover closely fit around said housing and positioned in close alignment with respect to said housing, said cover and said housing defining a document entry path closely aligned to said image sensor, said document drive roller, and said document sensors.

7. Apparatus according to claim 6 wherein said cover and said housing also define one or more document exit paths.

8. Apparatus according to claim 7 wherein said cover includes a plurality of cover portions, said cover portions interlocking to accurately position said cover portions with respect to each other and with respect to said housing.

9. Apparatus according to claim 7 wherein said cover has a plurality of sides, including a front side intended for orientation toward a user, said front side containing the entrance to said document entry path, said cover including a movable member adjustable by said user to one of two positions, said movable member cooperating with said cover and said housing to define a first document exit path directing documents generally toward said user and a second document exit path directing documents generally away from said user.

10. Apparatus according to claim 6 wherein said document sensors include a set of document-insertion-detecting sensors.

11. Apparatus according to claim 10 wherein said document-insertion-detecting sensors are mechanical sensors located in the document entry path.

12. Apparatus according to claim 11 wherein said document-insertion-detecting sensors comprise a plurality of physically connected flag-shaped members, the plurality of members carried by a support shaft held by said housing and rotating in unison along the axis of said shaft, each member having a first portion extending through said entry path.

13. Apparatus according to claim 12 further comprising a tail member carried by said support shaft for interrupting the optical path of an optical sensor when the tail member is rotated as a document is inserted into said entry path.

14. Apparatus according to claim 13 further comprising a chassis held by said housing in close alignment with said document-insertion-detecting sensors, and an optical sensor affixed to said chassis and positioned to sense said tail member.

15. Apparatus according to claim 12 wherein said document sensors include a set of document-skew-detecting sensors and wherein said document-skew-detecting sensors comprise a plurality of independent flag-shaped members, the plurality of document-skew-detecting sensors carried by said support shaft and rotatable independently with respect to said document-insertion-detecting members.

16. Apparatus according to claim 15 wherein each of said document-skew-detecting sensor members has a tail portion for interrupting the optical path of an optical sensor when the tail member is rotated.

17. Apparatus according to claim 12 wherein said document sensors include a set of document-skew-detecting sensors.

18. Apparatus according to claim 6 wherein said document entry path has an elongated width and said set of document-skew-detecting sensors includes at least two sensors, wherein at least one sensor is located near one edge of the entry path width and at least one other sensor is located near the other edge of the entry path width.

19. Apparatus according to claim 18, the apparatus further comprising a reversible motor coupled to said drive roller for drawing a document from the user through said input path, and means for reversing the motor to return a document to the user through said input path when a document-skew-detecting sensor detects the presence of a skewed document in said input path.

20. Apparatus according to claim 1 further comprising a spring held and positioned by said housing so as to urge said image sensor into contact with said drive roller.

21. Apparatus according to claim 1 further comprising a cover closely fit around said housing and positioned in close alignment with respect to said housing, said cover and said housing defining a document entry path closely aligned to said image sensor and said document drive roller.

22. Apparatus according to claim 21 wherein said cover and said housing also define one or more document exit paths.

23. Apparatus according to claim 22 wherein said cover includes a plurality of portions, said cover portions interlocking to accurately position said portions with respect to each other and with respect to said housing.

24. Apparatus according to claim 22 wherein said cover has a plurality of sides, including a front side intended for orientation toward a user, said front side containing the entrance to said document entry path, said cover including a movable member adjustable by said user to one of two positions, said movable member cooperating with said cover and said housing to define a first document exit path directing documents generally toward said user and a second document exit path directing documents generally away from said user.

25. Apparatus according to claim 9 or claim 24 wherein said movable member is removable to allow access by the user to the document path.

26. Apparatus according to claim 1 wherein said housing is formed from a material having a coefficient of friction sufficiently low as to provide a self-bearing surface with said drive roller.

27. Apparatus according to claim 1 further comprising spring means held and positioned by said housing so as to urge said image sensor into contact with said drive roller along a contact line with a substantially uniform force along the working length of the image sensor.

* * * * *